United States Patent
Hung et al.

(10) Patent No.: US 10,566,891 B2
(45) Date of Patent: Feb. 18, 2020

(54) POWER SUPPLY DEVICE AND CONTROL METHOD THEREOF

(71) Applicant: DELTA ELECTRONICS, INC., Taoyuan (TW)

(72) Inventors: Wei-Chih Hung, Taoyuan (TW); Yen-Wei Lin, Taoyuan (TW); Yung-Chin Wang, Taoyuan (TW); Min-Cheng Chiang, Taoyuan (TW); Te-Chih Peng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/262,887

(22) Filed: Jan. 30, 2019

(65) Prior Publication Data
US 2019/0267886 A1    Aug. 29, 2019

Related U.S. Application Data

(60) Provisional application No. 62/634,206, filed on Feb. 23, 2018.

(30) Foreign Application Priority Data

Oct. 9, 2018  (CN) .......................... 2018 1 1173751

(51) Int. Cl.
*H02M 3/335* (2006.01)
*H02M 1/08* (2006.01)
(Continued)

(52) U.S. Cl.
CPC .............. *H02M 1/08* (2013.01); *H02M 3/156* (2013.01); *H02M 3/33507* (2013.01);
(Continued)

(58) Field of Classification Search
CPC .. H02M 1/4225; H02M 1/08; H02M 3/33576; H02M 2001/0009; G06F 1/26
(Continued)

(56) References Cited

U.S. PATENT DOCUMENTS 4,084,103 A * 4/1978 Burns, III ............. H02M 3/157
307/132 EA
6,246,184 B1 * 6/2001 Salerno ................ H05B 39/047
315/200 A
(Continued)

FOREIGN PATENT DOCUMENTS

TW    201117543 A1    5/2011
TW    201225473 A1    6/2012

*Primary Examiner* — Rajnikant B Patel
(74) *Attorney, Agent, or Firm* — CKC & Partners Co., LLC (57) ABSTRACT

A power supply device includes a voltage converting circuit and a mode switching circuit. The voltage converting circuit is configured to receive a first voltage and convert the first voltage to a second voltage. The mode switching circuit is configured to provide an output voltage and an output current to a load according to the second voltage. The mode switching circuit includes a switch configured to maintain on or off on the condition that the power supply device is operated under a constant voltage output mode such that the value of the output voltage corresponds to the second voltage, and the switch is configured to switch between on and off on the condition that the power supply device is operated under a constant current output mode such that the output current of the mode switching circuit is a constant value.

16 Claims, 8 Drawing Sheets

(51) Int. Cl.
   *H02M 3/156* (2006.01)
   *G06F 1/26* (2006.01)
   *H02M 1/00* (2006.01)

(52) U.S. Cl.
   CPC ... *H02M 3/33569* (2013.01); *H02M 3/33576* (2013.01); *G06F 1/26* (2013.01); *H02M 2001/007* (2013.01); *H02M 2001/0009* (2013.01)

(58) Field of Classification Search
   USPC ..... 363/16, 17, 21.01, 21.12, 89, 95, 97, 98, 363/127, 132
   See application file for complete search history.

(56) References Cited

U.S. PATENT DOCUMENTS

| | | | |
|---|---|---|---|
| 8,102,164 B2* | 1/2012 | Colbeck | H02M 1/4225 363/271 |
| 9,565,731 B2* | 2/2017 | DeJonge | H05B 33/0848 |
| 2005/0207196 A1* | 9/2005 | Holmes | H05B 33/0815 363/126 |
| 2007/0103949 A1* | 5/2007 | Tsuruya | H02M 1/4225 363/125 |
| 2009/0128101 A1* | 5/2009 | Skinner | H02M 3/1584 323/220 |
| 2010/0039836 A1* | 2/2010 | Gong | H02M 3/156 363/21.13 |
| 2011/0109288 A1 | 5/2011 | Lee et al. | |

* cited by examiner

POWER SUPPLY DEVICE AND CONTROL METHOD THEREOF

CROSS-REFERENCE TO RELATED APPLICATION

This application claims priority to U.S. Provisional Application Ser. No. 62/634,206, filed Feb. 23, 2018 and China Application Serial Number 201811173751.8, filed Oct. 9, 2018, which are herein incorporated by reference.

BACKGROUND

Technical Field

The present application relates to a power supply device, and particularly relates to a power supply device that is operable in different output modes.

Description of Related Art

With the development of technologies in the field of devices related to servers and data centers, different types of servers or data centers have different power supply requirements, and the power supply of the server or data center also needs to provide a wider range of output voltage for powering the server or data center.

In addition, with the rise of awareness of environmental protection and energy conservation, how to improve the conversion efficiency of the power supply device while satisfying the power supply requirements of the server and the data center is a research goal in the technical field.

SUMMARY

An aspect of the present application is a power supply device. The power supply device includes a voltage converting circuit and a mode switching circuit. The voltage converting circuit is configured to receive a first voltage and convert the first voltage into a second voltage. The mode switching circuit is configured to provide an output voltage and an output current to a load according to the second voltage. The mode switching circuit includes a switch. The switch maintains on or off when the power supply device operates in a constant voltage output mode such that a voltage value of the output voltage corresponds to the second voltage, and switches between on and off when the power supply device operates in a constant current output mode such that the output current of the mode switching circuit is a constant value.

In embodiments, the power supply device further comprises a control circuit configured to output a control signal to the switch to control the switch to be on or off according to a load state of the load. The control signal maintains at a constant level in the constant voltage output mode.

In embodiments, the power supply device includes a current detecting circuit configured to detect the output current and output a current feedback signal to the control circuit. In the constant current output mode, the control circuit switches the control signal between an enable level and a disable level according to the current feedback signal, to adjust a duty cycle or a switching frequency of the control signal.

In embodiments, the control signal has a first duty cycle and a first switching frequency when the output current has a first current value, and the control signal has a second duty cycle and a second switching frequency when the output current has a second current value. The first duty cycle is less than the second duty cycle or the first switching frequency is less than the second switching frequency when the first current value is larger than the second current value.

In embodiments, the control signal maintains at the constant level when the load state of the load is less than a threshold value, the control circuit switches the control signal between the enable level and the disable level when the load state of the load is larger than the threshold value.

In embodiments, the voltage converting circuit includes a DC-AC converting unit, a transformer unit and an AC-DC converting unit. The DC-AC converting unit is configured to convert the first voltage into an AC voltage signal. A primary side of the transformer unit is electrically coupled to the DC-AC converting unit. The AC-DC converting unit is electrically coupling to a secondary side of the transformer unit an AC-DC converting unit to convert the AC voltage signal coupled to the secondary side into the second voltage.

In embodiments, the mode switching circuit comprises a buck converter, and the buck converter comprises the switch, a diode unit, an inductor unit and a capacitor unit. A first end of the switch is electrically coupled to the voltage converting circuit, a cathode of the diode unit is electrically coupled to a first end of the inductor unit, a second end of the inductor unit is electrically coupled to a first end of the capacitor unit, a second end of the capacitor unit is electrically coupled to an anode of the diode unit, a second end of the switch is electrically coupled to the cathode of the diode unit or the anode of the diode unit.

In embodiments, the mode switching circuit includes a boost converter. The boost converter includes a switch, a diode unit, an inductor unit and a capacitor unit. A first end of the inductor unit is electrically coupled to the voltage converting circuit, a second end of the inductor unit is electrically coupled to a first end of the switch and an anode of the diode unit, a cathode of the diode unit is electrically coupled to a first end of the capacitor unit, a second end of the capacitor unit is electrically coupled to a second end of the switch.

Another aspect of the present disclosure is a power supply device control method. The power supply device control method includes following steps. Converting a first voltage into a second voltage through a voltage converting circuit. Providing an output voltage and an output current to a load according to the second voltage through a mode switching circuit. Controlling a switch in the mode switching circuit to maintain on or off when the power supply device operates in a constant voltage output mode, such that a voltage value of the output voltage corresponds to the second voltage. Controlling the switch to switch between on or off when the power supply device operates in a constant current output mode, such that an output current output by the mode switching circuit is a constant value.

In embodiments, the power supply device control method further comprises: outputting a control signal to the switch through a control circuit to control the switch to be on or off according to a load state of the load, wherein the control signal maintains at a constant level in the constant voltage output mode.

In embodiments, the power supply device control method further comprises: detecting the output current and outputting a current feedback signal to the control circuit through a current detecting circuit; and switching the control signal between an enable level and a disable level through the control circuit according to the current feedback signal in the constant current output mode, to adjust a duty cycle or a switching frequency of the control signal.

In embodiments, the control signal has a first duty cycle and a first switching frequency when the output current has a first current value, the control signal has a second duty cycle and a second switching frequency when the output current has a second current value, wherein the first duty cycle is less than the second duty cycle or the first switching frequency is less than the second switching frequency when the first current value is larger than the second current value.

In embodiments, the power supply device control method further comprises: maintaining the control signal at the constant level through the control circuit when the load state of the load is less than a threshold value; and switching the control signal between the enable level and the disable level through the control circuit when the load state of the load is larger than the threshold value.

In embodiments, the power supply device control method further comprises: converting the first voltage into an AC voltage signal through a DC-AC converting unit, the DC-AC converting unit is electrically coupled to a primary side of a transformer unit; and converting the AC voltage signal coupling to a secondary side of the transformer unit into the second voltage through an AC-DC converting unit electrically coupling to the secondary side of the transformer unit.

In embodiments, the mode switching circuit comprises a buck converter, the buck converter comprises the switch, a diode unit, an inductor unit and a capacitor unit, wherein a first end of the switch is electrically coupled to the voltage converting circuit, a cathode of the diode unit is electrically coupled to a first end of the inductor unit, a second end of the inductor unit is electrically coupled to a first end of the capacitor unit, a second end of the capacitor unit is electrically coupled to an anode of the diode unit, a second end of the switch is electrically coupled to the cathode of the diode unit or the anode of the diode unit.

In embodiments, the mode switching circuit comprises a boost converter, the boost converter comprises the switch, a diode unit, an inductor unit and a capacitor unit, wherein a first end of the inductor unit is electrically coupled to the voltage converting circuit, a second end of the inductor unit is electrically coupled to a first end of the switch and an anode of the diode unit, a cathode of the diode unit is electrically coupled to a first end of the capacitor unit, a second end of the capacitor unit is electrically coupled to a second end of the switch.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure. In addition, according to industry standards and conventions, the drawings are for the purpose of illustration only and are not drawn according to the original dimensions. In fact, the dimensions of the various features may be arbitrarily increased or decreased for convenience of explanation. In the following description, the same components will be denoted by the same reference numerals for explanation.

The terms used in the entire specification and the scope of the patent application, unless otherwise specified, generally have the ordinary meaning of each term used in the field, the content disclosed herein, and the particular content. Certain terms used to describe the disclosure are discussed below or elsewhere in this specification to provide additional guidance to those skilled in the art in the description of the disclosure.

In addition, the terms "including", "comprising", "having", "containing" and the like, as used herein, are all open-ended terms, meaning "including but not limited to". Further, "and/or" as used herein includes any one or combination of one or more of the associated listed items.

As used herein, when an element is referred to as "connected" or "coupled", it may mean "electrically connected" or "electrically coupled". "Connected" or "coupled" can also be used to indicate that two or more components operate or interact with each other. In addition, although the terms "first", "second", etc. are used herein to describe different elements, the terms are only used to distinguish elements or operations described in the same technical terms. Unless clearly indicated in the context, the use of the term is not specifically intended or implied, and is not intended to limit the invention.

Figure 1:
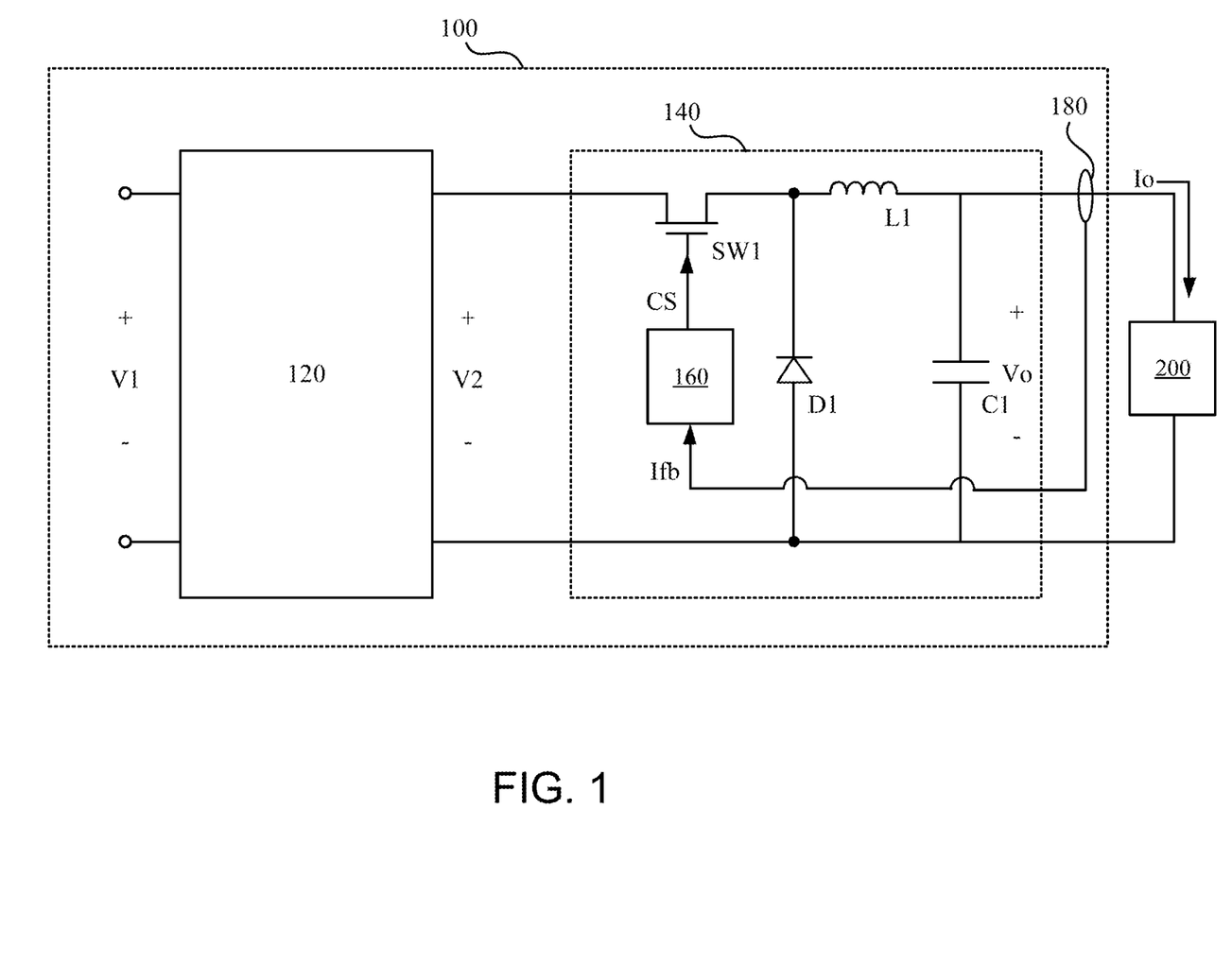
FIG. 1 is a schematic diagram of the power supply device according to embodiments of the present disclosure.

Reference is made to FIG. 1. FIG. 1 is a schematic diagram of the power supply device 100 according to embodiments of the present disclosure. The power supply device 100 is used to receive a voltage V1 and output an output voltage Vo and an output current Io to a load 200. For example, the load 200 can be a variety of apparatuses for used in servers, data centers, etc., but the present disclosure is not limited thereto.

As shown in FIG. 1, in embodiments, the power supply device 100 includes a voltage converting circuit 120, a mode switching circuit 140, a control circuit 160 and a current detecting circuit 180. From the perspective of structure, the output of the voltage converting circuit 120 is electrically coupled to the input of the mode switching circuit 140. The control circuit 160 is electrically coupled to the mode switching circuit 140 and the current detecting circuit 180.

In operation, the voltage converting circuit 120 is configured to receive the voltage V1, and converting the voltage V1 into the voltage V2. In embodiments, the voltage V1 and the voltage V2 can be DC, and the voltage converting circuit 120 can be implemented by a variety of DC-DC convertors, the details will be explained in the following paragraphs.

The mode switching circuit 140 is used to receive the voltage V2 from the voltage converting circuit 120, and provide an output voltage Vo and an output current Io to the load 200 according to the voltage V2. In particular, the switch SW1 in the mode switching circuit 140 can be operated differently according to whether the power supply device 100 is operated in a constant voltage output mode or a constant current output mode, to implement the constant voltage output or the constant current output of the power supply device 100. For example, in some embodiments, the power supply device 100 can charge the load 200 at the back end, and adjust the output voltage Vo and the output current Io for the back end charging according to the charging curve of the load 200.

In the embodiment shown in FIG. 1, the control circuit 160 outputs a control signal CS to the switch SW1 in the mode switching circuit 140 according to the load state of the load 200, to control the switch SW1 to be on or off. In particular, when the load state of the load 200 is less than a threshold value, the control signal CS can be maintained at a constant level to control the power supply device 100 to be operated in the constant voltage output mode. In the constant voltage output mode, since the control signal CS is maintained at a constant level, the switch SW1 is maintained to be on or off.

For example, in the present embodiment, the mode switching circuit 140 is a buck converter. The buck converter includes a switch SW1, a diode unit D1, an inductor unit L1 and a capacitor unit C1. From the perspective of structure, the first end of the switch SW1 is electrically coupled to the first output end of the voltage converting circuit 120. The second end of the switch SW1 is electrically coupled to the cathode of the diode unit D1. The cathode of the diode unit D1 is electrically coupled to the first end of the inductor unit L1. The second end of the inductor unit L1 is electrically coupled to the first end of the capacitor unit C1. The second end of the capacitor unit C1 is electrically coupled to the anode of the diode unit D1 and the second output end of the voltage converting circuit 120.

It should be noted that in some other embodiments, the buck converter can also be implemented in different architectures. For example, in some other embodiments, the cathode of the diode unit D1 is electrically coupled to the first end of the inductor unit L1 and the first output end of the voltage converting circuit 120. The second end of the inductor unit L1 is electrically coupled to the first end of the capacitor unit C1. The second end of the capacitor unit C1 is electrically coupled to the anode of the diode unit D1. The first end of the switch SW1 is electrically coupled to the second output end of the voltage converting circuit 120, and the second end of the switch SW1 is electrically coupled to the anode of the diode unit D1. In addition, in various embodiments, the buck converter can be implemented by a variety of different architectures, and the architectures listed above is merely for illustration only and is not intended to limit the present disclosure.

The switch SW1 maintains on according to the control signal CS having an enable level (e.g., high level) when the power supply device 100 is operated in the constant voltage output mode, such that the voltage value of the output voltage Vo corresponds to the voltage V2 and maintains constant during the operation.

On the other hand, when the load state of the load 200 is larger than a threshold value, the control circuit 160 is used to switch the control signal CS between an enable level (e.g., high level) and a disable level (e.g., low level), to control the power supply device 100 to be operated in the constant current output mode. When the power supply device 100 is operated in the constant current output mode, the switch SW1 is switched between on and off such that the output current Io output by the mode switching circuit 140 is constant.

In particular, the current detecting circuit 180 can be used to detect the output current Io and output the current feedback signal Ifb to the control circuit 160. The current detecting circuit 180 can be implemented by many ways, e.g., a sense resistor, a Hall sensor, a current transformer or other current sensors.

In the constant current output mode, the control circuit 160 switches the control signal CS between an enable level (e.g., high level) and a disable level (e.g., low level) according to the current feedback signal Ifb, to adjust a duty cycle or a switching frequency of the control signal CS. Accordingly, the mode switching circuit 140 can be used as a buck converter to control the output voltage Vo and/or the output current Io through Pulse Width Modulation (PWM) and Pulse Frequency Modulation (PFM).

For example, in embodiments, in the constant current output mode, the larger the output current Io, the lower the switching frequency of the control signal CS, and the lesser the duty cycle. The lesser the output current Io, the higher the switching frequency of the control signal CS, and the larger the duty cycle. In other words, when the output current Io has a first current value, the control signal CS has a first duty cycle and a first switching frequency. When the output current Io has a second current value, the control signal CS has a second duty cycle and a second switching frequency. When the first current value is larger than the second current value, the first duty cycle is lesser than the second duty cycle, or the first switching frequency is less than the second switching frequency. In some embodiments, the control circuit 160 can decrease the switching frequency and the duty cycle when the output load increases, to implement the constant current control.

As such, a feedback control can be performed by detecting the output current Io, to maintain the output current Io at an appropriate target value for powering the load 200, to meet the power requirement of the back end.

In addition, in different embodiments, the control circuit 160 can also decide the output mode of the power supply device 100 according to actual needs. For example, in some embodiments, the control circuit 160 can adjust the output mode of the power supply device 100 according to user configurations. In some embodiments, the control circuit 160 can use any one of the output voltage Vo, the output current Io of the power supply device 100 or the combinations thereof as the threshold value, for deciding the output mode and outputting the corresponding control signal CS.

As such, the power supply device 100 can arrange the voltage converting circuit 120 at the front end to adjust the voltage level, and arrange the mode switching circuit 140 at the back end, to select between enabling and disabling the constant current output mode.

In addition, since a two-stage architecture of the voltage converting circuit 120 and the mode switching circuit 140 is employed, the power supply device 100 has a wider output voltage range, as compared to when the single-stage circuit is solely employed. For example, in some embodiments, when the voltage converting circuit 120 operates in the constant voltage mode, the power supply device 100 outputs a rated voltage value (e.g., about 240V). For a power supply device 100 employing a single-stage circuit, when entering the constant current mode, the lowest voltage can merely be adjusted to about 75% to about 90% of the rated voltage value. In one example, the lowest voltage can be merely adjusted to about 80% (e.g., about 200V) of the rated voltage value. In contrast, in the embodiments of the present disclosure, the lowest voltage can be adjusted to about 7% to about 15% of the rated voltage value through the operations of the mode switching circuit 140 at the back end. In one example, the lowest voltage can be adjusted to about 10%

(e.g., about 20V) of the rated voltage value while maintaining in the constant current mode. Accordingly, through the two-stage architecture, the power supply device 100 can be operated in a relatively wider output voltage range when outputting constant current, to meet the requirements of various server equipment or data centers. In addition, the specific numerical values and numerical ranges discussed above are merely examples and are not intended to limit the present disclosure.

When the power supply device 100 does not need to output a constant current, the switch SW1 does not need to be switched. Since the switching loss of the switching device is reduced, the overall conversion efficiency of the power supply device 100 can be improved, and a more energy-saving and environmentally-friendly circuit design can be realized.

Figure 2:
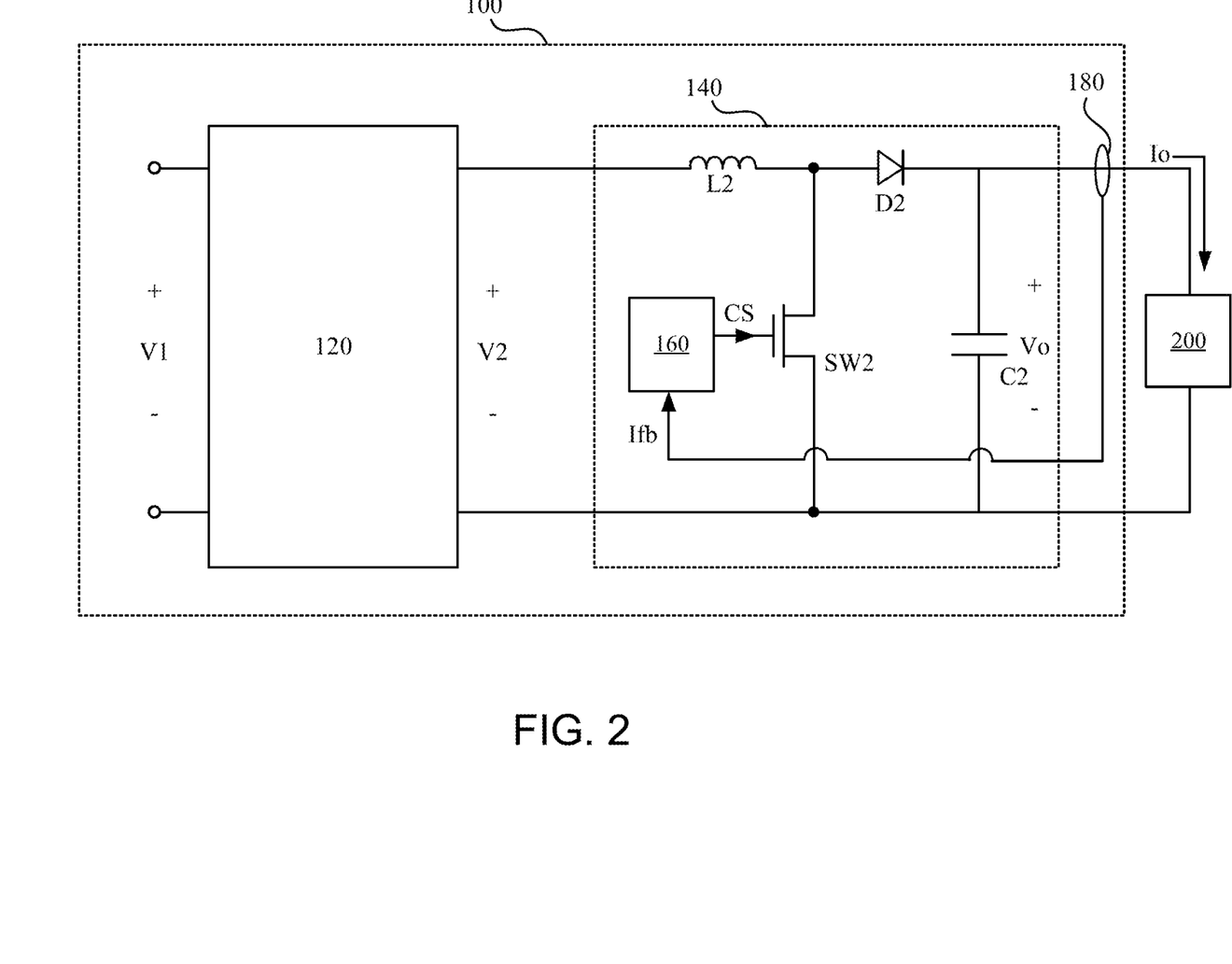
FIG. 2 is a schematic diagram of the power supply device according to other embodiments of the present disclosure.

Reference is made to FIG. 2. FIG. 2 is a schematic diagram of the power supply device 100 according to other embodiments of the present disclosure. For ease of understanding, in FIG. 2, the same or similar elements as those in the embodiment of FIG. 1 are denoted by the same reference numerals, and the operations that have been described in detail in the preceding paragraphs are not described herein again unless necessary.

Compared to the embodiment shown in FIG. 1, in the embodiment shown in FIG. 2, the mode switching circuit 140 is a boost converter. The boost converter includes a switch SW2, a diode unit D2, an inductor unit L2 and a capacitor unit C2. From the perspective of structure, the first end of the inductor unit L2 is electrically coupled to the voltage converting circuit 120, the second end of the inductor unit L2 is electrically coupled to the first end of the switch SW2 and the anode of the diode unit D2. The cathode of the diode unit D2 is electrically coupled to the first end of the capacitor unit C2. The second end of the capacitor unit C2 is electrically coupled to the second end of the switch SW2.

In the embodiment of the mode switching circuit 140 being a boost converter, the switch SW2 maintains off according to the control signal CS having a disable level (e.g., low level) when the power supply device 100 is operated in the constant voltage output mode, such that the voltage value of the output voltage Vo corresponds to the voltage V2 and maintains constant during the operation.

On the other hand, when the load state of the load 200 is larger than a threshold value, the control circuit 160 is used to switch the control signal CS between an enable level (e.g., high level) and a disable level (e.g., low level), to control the power supply device 100 to be operated in the constant current output mode. When the power supply device 100 is operated in the constant current output mode, the switch SW2 is switched between on and off such that the output current Io output by the mode switching circuit 140 is constant. Those skilled in the art will understand the similar operation of the switch SW2/SW1 in the boost converter circuit and the buck converter circuit, and thus the details thereof will not be repeated here. In addition, the present disclosure is not limited to this, as in other embodiments the mode switching circuit 140 can also be implemented by a buck-boost dual-purpose converter or other suitable switching power conversion circuit.

In addition, although in the embodiments of FIGS. 1 and 2 the switches SW1, SW2 are implemented by an N-Type Metal Oxide Semiconductor Field Effect Transistor (N-Type MOSFET), the present disclosure is not limited to this. In other embodiments, the switches SW1, SW2 can also be implemented by a P-Type Metal Oxide Semiconductor Field Effect Transistor (P-Type MOSFET).

Since the enabling and disabling operations of a P-Type MOSFET and an N-Type MOSFET are contrary to each other, in the embodiment of implementing by P-Type MOSFET, in the constant current output mode, the larger the output current Io, the lower the switching frequency of the control signal CS, and the larger the duty cycle. The lesser the output current Io, the higher the switching frequency of the control signal CS, and the lesser the duty cycle. In other words, when the output current Io has a first current value, the control signal CS has a first duty cycle and a first switching frequency. When the output current Io has a second current value, the control signal CS has a second duty cycle and a second switching frequency. When the first current value is larger than the second current value, the first duty cycle is larger than the second duty cycle, or the first switching frequency is less than the second switching frequency. In embodiments, the control circuit 160 can decrease the switching frequency and increase the duty cycle when the output load increases, to implement the constant current control.

Figure 3:
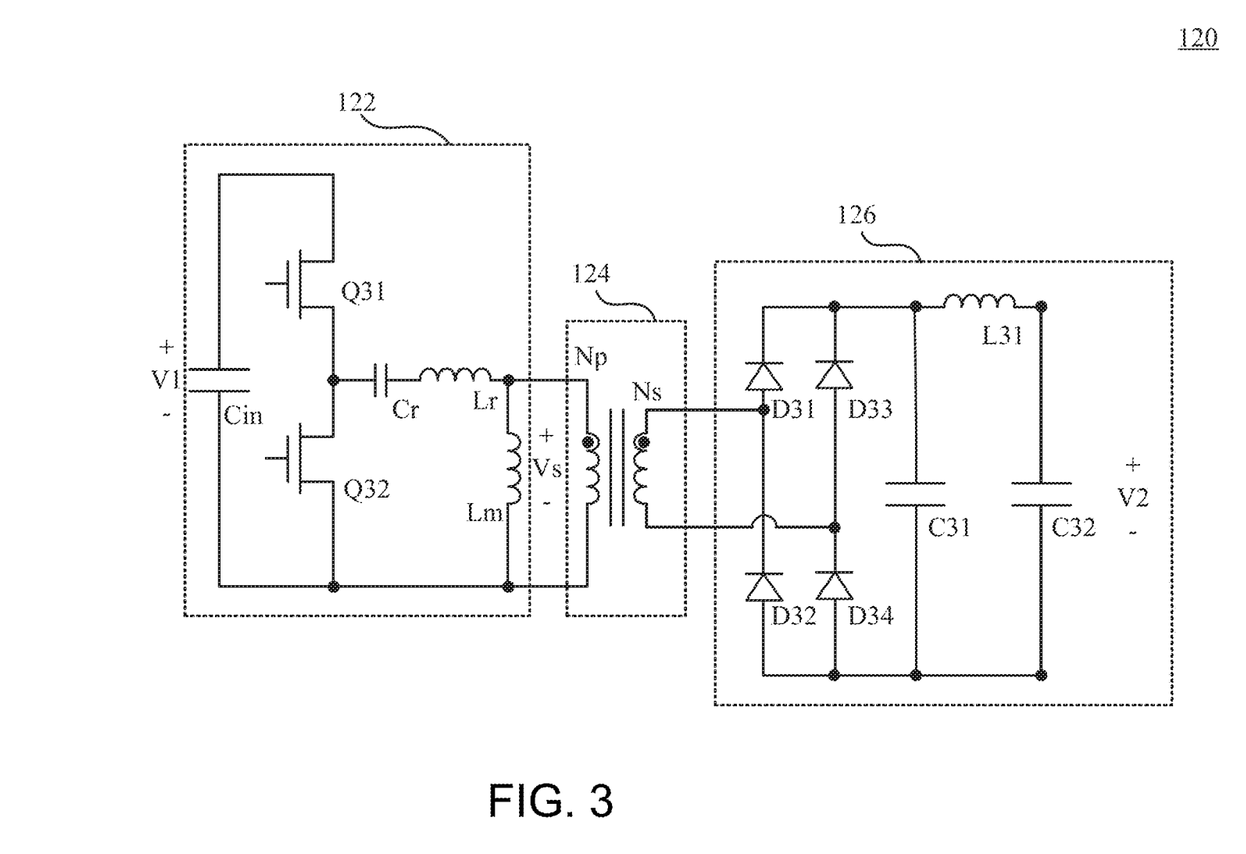
FIG. 3 is a schematic diagram of the voltage converting circuit according to embodiments of the present disclosure.

Reference is made to FIG. 3. FIG. 3 is a schematic diagram of the voltage converting circuit 120 according to embodiments of the present disclosure. As shown in FIG. 3, in embodiments, the voltage converting circuit 120 includes a DC-AC converting unit 122, a transformer unit 124 and an AC-DC converting unit 126. From the perspective of structure, a primary side Np of the transformer unit 124 is electrically coupled to the DC-AC converting unit 122, and a secondary side Ns of the transformer unit 124 is electrically coupled to the AC-DC converting unit 126.

In operation, the voltage converting circuit 120 is configured to convert the voltage V1 into an AC voltage signal Vs. The AC-DC converting unit 126 is used to convert the AC voltage signal Vs coupling to the secondary side Ns into a second voltage V2. As such, the voltage converting circuit 120 can be used as a constant voltage source outputting a voltage V2 at a target voltage level to the mode switching circuit 140, and implementing the electrical isolation between the primary side Np and the secondary side Ns of the transformer unit 124.

In other embodiments, the DC-AC converting unit 122 and the AC-DC converting unit 126 can be implemented by different specific circuits. As shown in FIG. 3, in embodiments, the DC-AC converting unit 122 can be a half-bridge LLC circuit, including transistor switches Q31 and Q32, a resonant capacitor Cr, resonant inductors Lr and Lm. In embodiments, the resonant inductors Lr, Lm can be the leakage inductance and the magnetizing inductance of the transformer unit 124, respectively. The first end of the transistor switch Q31 is electrically coupled to the first end of the input capacitor Cin, and the second end of the transistor switch Q31 is electrically coupled to the first end of the transistor switch Q32 and the first end of the resonant capacitor Cr. The second end of the transistor switch Q32 is electrically coupled to the second end of the input capacitor Cin. The second end of the resonant capacitor Cr is electrically coupled to the first end of the resonant inductor Lr. The second end of the resonant inductor Lr is electrically coupled to the first end of the resonant inductor Lm and the first end of the primary side Np. The second end of the resonant inductor Lm is electrically coupled to the second end of the primary side Np and the second end of the transistor switch Q32.

The AC-DC converting unit 126 can be a full-wave rectifying circuit. As shown in FIG. 3, the AC-DC converting unit 126 can include diode units D31, D32, D33 and D23, filtering capacitors C31 and C32 and filtering inductor L31. From the perspective of structure, the cathode of the diode unit D31 is electrically coupled to the cathode of the diode unit D33, the first end of the filtering capacitor C31 and the first end of the filtering inductor L31. The anode of the diode unit D31 is electrically coupled to the cathode of the diode unit D32 and the first end of the secondary side Ns. The anode of the diode unit D32 is electrically coupled to the anode of the diode unit D34, the second end of the filtering capacitor C31 and the second end of the filtering capacitor C32. The anode of the diode unit D33 is electrically coupled to the cathode of the diode unit D34 and the secondary end of the secondary side Ns. The second end of the filtering inductor L31 is electrically coupled to the first end of the filtering capacitor C32. Those skilled in the art will understand how the DC-AC converting unit 122 and the AC-DC converting unit 126 implement voltage conversion by the circuit elements therein, and thus the details thereof will not be repeated here.

Figure 4:
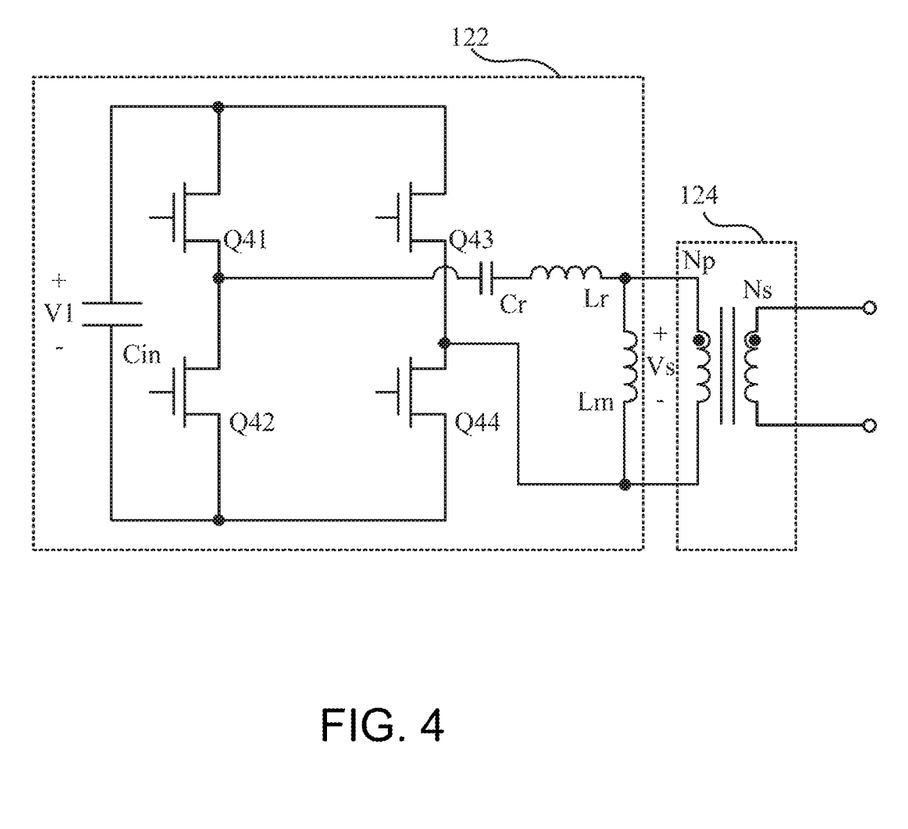
FIGS. 4 and 5 are schematic diagrams of the DC-AC converting unit according to other embodiments of the present disclosure, respectively.
Figure 5:
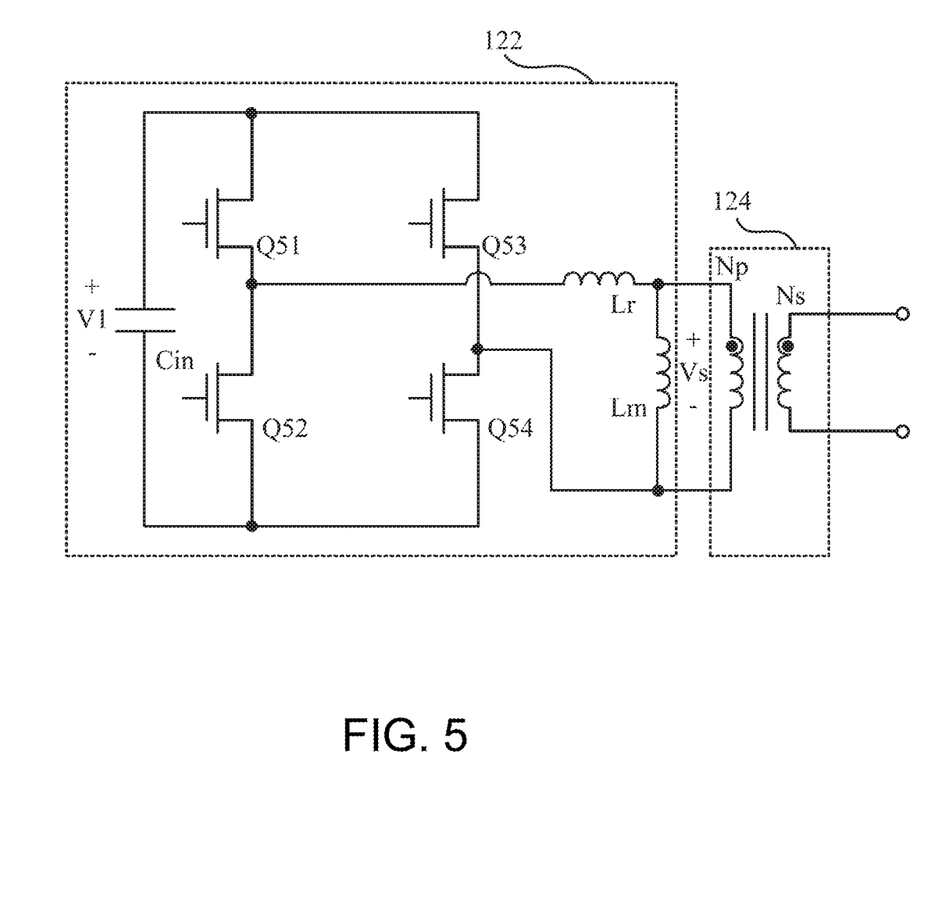

Reference is made to FIGS. 4 and 5. FIGS. 4 and 5 are schematic diagrams of the DC-AC converting unit 122 according to other embodiments of the present disclosure, respectively.

As shown in FIG. 4, in embodiments, the DC-AC converting unit 122 can be a full-bridge LLC circuit, including transistor switches Q41, Q42, Q43 and Q44, a resonant capacitor Cr and resonant inductors Lr and Lm. The first end of the transistor switch Q41 and the first end of the transistor switch Q43 are electrically coupled to the first end of the input capacitor Cin. The second end of the transistor switch Q41 is electrically coupled to the first end of the transistor switch Q42 and the first end of the resonant capacitor Cr. The second end of the transistor switch Q42 is electrically coupled to the second end of the input capacitor Cin. The second end of the resonant capacitor Cr is electrically coupled to the first end of the resonant inductor Lr. The second end of the resonant inductor Lr is electrically coupled to the first end of the resonant inductor Lm and the first end of the primary side Np. The second end of the resonant inductor Lm is electrically coupled to the second end of the primary side Np, the second end of the transistor switch Q43 and the first end of the transistor switch Q44. The second end of the transistor switch Q44 is electrically coupled to the second end of the input capacitor Cin.

As shown in FIG. 5, in embodiments, the DC-AC converting unit 122 can be a phase shift full-bridge circuit, including transistor switches Q51, Q52, Q53 and Q54 and resonant inductors Lr and Lm. The first end of the transistor switch Q51 and the first end of the transistor switch Q53 are electrically coupled to the first end of the input capacitor Cin. The second end of the transistor switch Q51 is electrically coupled to the first end of the transistor switch Q52 and the first end of the resonant inductor Lr. The second end of the transistor switch Q52 is electrically coupled to the second end of the input capacitor Cin. The second end of the resonant inductor Lr is electrically coupled to the first end of the resonant inductor Lm and the first end of the primary side Np. The second end of the resonant inductor Lm is electrically coupled to the second end of the primary side Np, the second end of the transistor switch Q53 and the first end of the transistor switch Q54. The second end of the transistor switch Q54 is electrically coupled to the second end of the input capacitor Cin.

Figure 6:
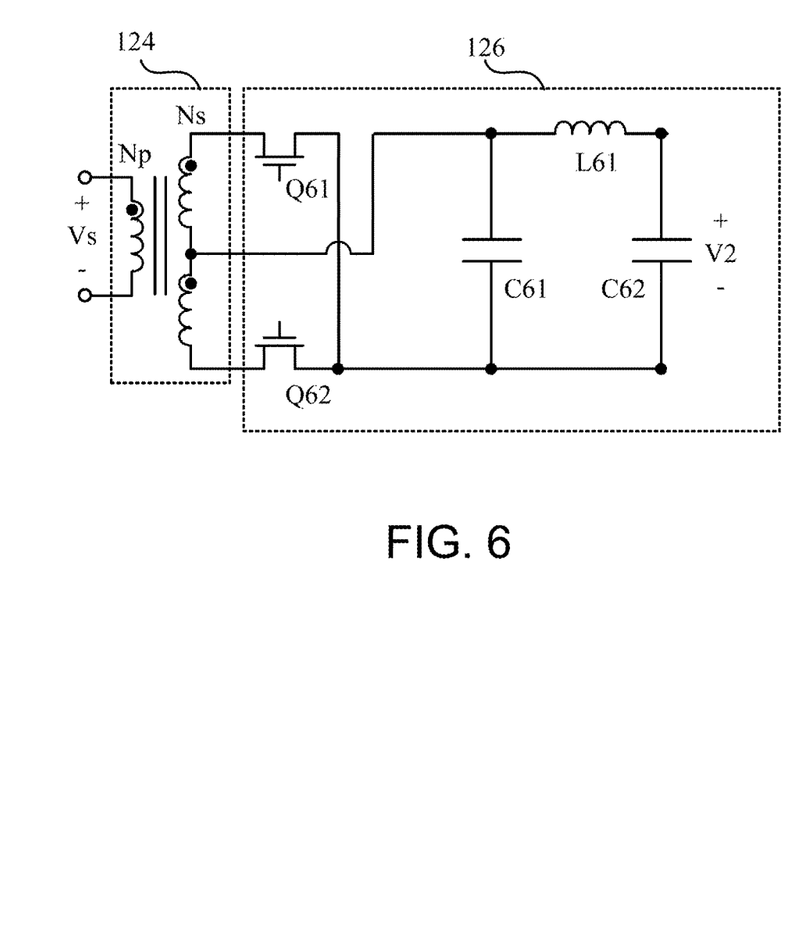
FIGS. 6 and 7 are schematic diagrams of the DC-AC converting unit according to other embodiments of the present disclosure, respectively.
Figure 7:
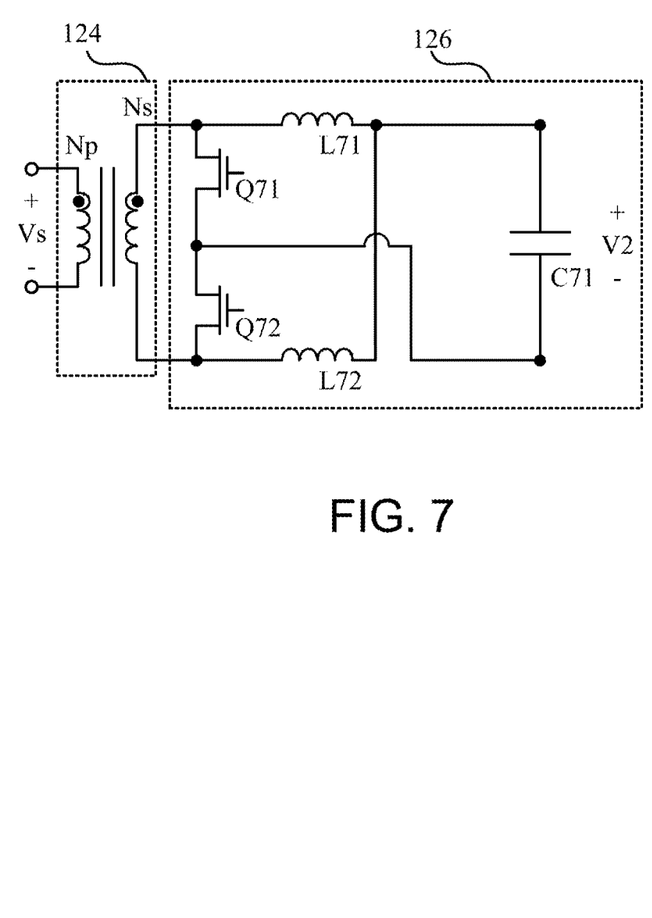

Reference is made to FIGS. 6 and 7. FIGS. 6 and 7 are schematic diagrams of the AC-DC converting unit 126 according to other embodiments of the present disclosure, respectively.

As shown in FIG. 6, in embodiments, the AC-DC converting unit 126 can be a center tapped rectifying circuit, including transistor switches Q61 and Q62, filtering capacitors C61 and C62 and filtering inductor L61. From the perspective of structure, the first end of the transistor switch Q61 and the first end of the transistor switch Q62 are electrically coupled to the first and second ends of the secondary side Ns, respectively. The center tap end of the secondary side Ns is electrically coupled to the first end of the filtering capacitor C61 and the first end of the filtering inductor L61. The second end of the filtering inductor L61 is electrically coupled to the first end of the filtering capacitor C62. The second end of the filtering capacitor C61 and the second end of the filtering capacitor C62 are electrically coupled to the second end of the transistor switch Q61 and the second end of the transistor switch Q62. It should be noted that in embodiments, the transistor switches Q61 and Q62 can also be replaced by suitable diode units to implement the center tapped rectifying circuit.

As shown in FIG. 7, in embodiments, the AC-DC converting unit 126 can be a current doubler including transistor switches Q71 and Q72, inductors L71 and L71 and a capacitor C71. From the perspective of structure, the first end of the transistor switch Q71 and the first end of the transistor switch Q72 are electrically coupled to the first and second ends of the secondary side Ns, respectively. The first end of the inductors L71 is electrically coupled to the first end of the transistor switch Q71, the first end of the inductor L72 is electrically coupled to the first end of the transistor switch Q72, the second end of the inductor L71 and the second end of the inductor L72 are both electrically coupled to the first end of the capacitor C71. The second end of the transistor switch Q71 and the second end of the transistor switch Q72 are both electrically coupled to the second end of the capacitor C71.

Figure 8:
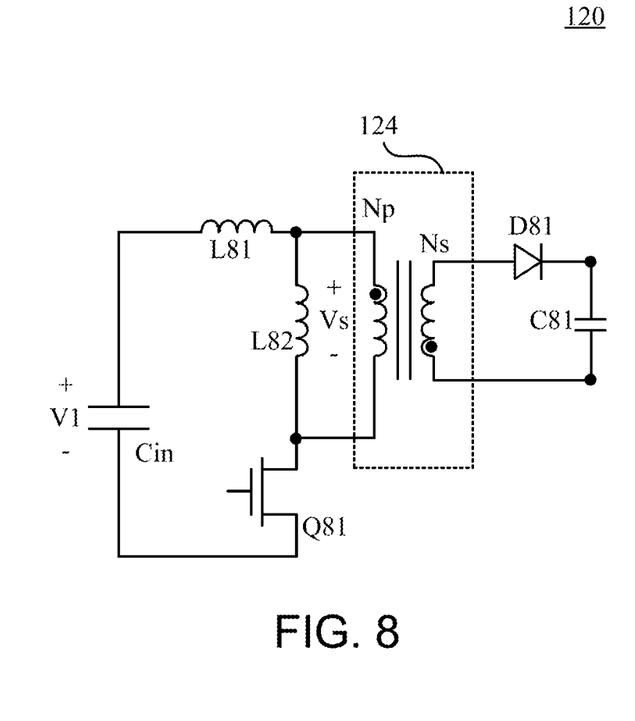
FIGS. 8 and 9 are schematic diagrams of the voltage converting circuit according to other embodiments of the present disclosure, respectively.
Figure 9:
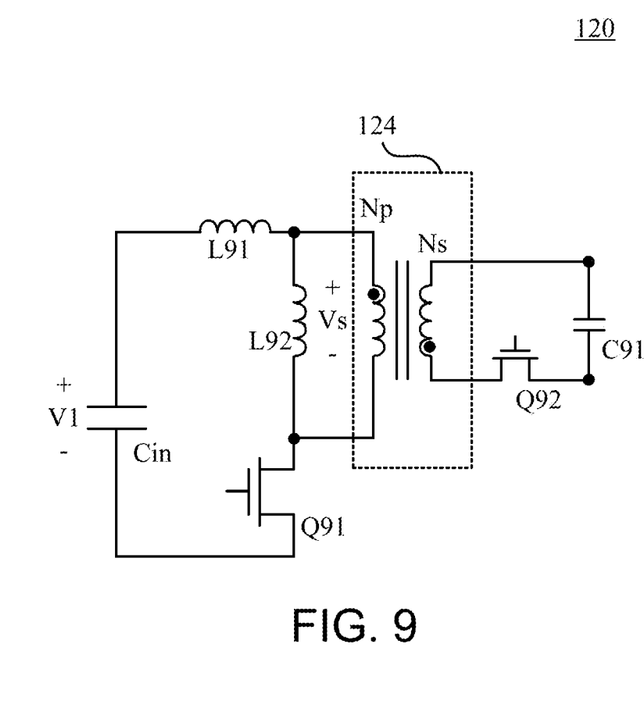

Reference is made to FIGS. 8 and 9. FIGS. 8 and 9 are schematic diagrams of the voltage converting circuit 120 according to other embodiments of the present disclosure, respectively.

As shown in FIGS. 8 and 9, in embodiments, the voltage converting circuit 120 can be implemented by a flyback converter. In the embodiment of FIG. 8, the voltage converting circuit 120 includes an input capacitor Cin, inductors L81 and L82, a transistor switch Q81, a transformer unit 124, a diode unit D81 and a capacitor C81. From the perspective of structure, the first end of the inductor unit L81 is electrically coupled to the first end of the input capacitor Cin, and the second end of the inductor L81 is electrically coupled to one end of the primary side Np of the transformer unit 124 and the first end of the inductor L82. The second end of the inductor L82 is electrically coupled to another end of the primary side Np and the first end of the transistor switch Q81. The second end of the transistor switch Q81 is electrically coupled to the second end of the input capacitor Cin. The anode of the diode unit D81 is electrically coupled to one end of the secondary side Ns of the transformer unit 124. The cathode of the diode unit D81 is electrically coupled to the first end of the capacitor C81. The second end of the capacitor C81 is electrically coupled to another end of the secondary side Ns of the transformer unit 124.

In the embodiment of FIG. 9, the diode unit D81 is replaced by a transistor switch Q92 at the secondary side Ns of the transformer unit 124 to perform synchronous rectification. The transistor switch Q92 is electrically coupled between the second end of the capacitor C91 and another end of the secondary side Ns of the transformer unit 124. The electrical connection relationships of the input capacitor Cin, the inductors L91 and L92, the transistor switch Q91 and the transformer unit 124 are similar to those of the embodiment of FIG. 8, and thus are omitted here.

Those skilled in the art will understand how the DC-AC converting unit 122 and the AC-DC converting unit 126 illustrated in FIGS. 4-7 and the voltage converting circuit 120 illustrated in FIGS. 8 and 9 implement voltage conversion by the circuit elements therein, and thus the details thereof will not be repeated here. In various embodiments, those skilled in the art may combine any one of the DC-AC converting unit 122 from FIGS. 3-5 with any one of the AC-DC converting unit 126 from FIGS. 6-7 to implement the voltage converting circuit 120. The contents discussed above are merely examples and is not intended to limit the present disclosure.

Figure 10:
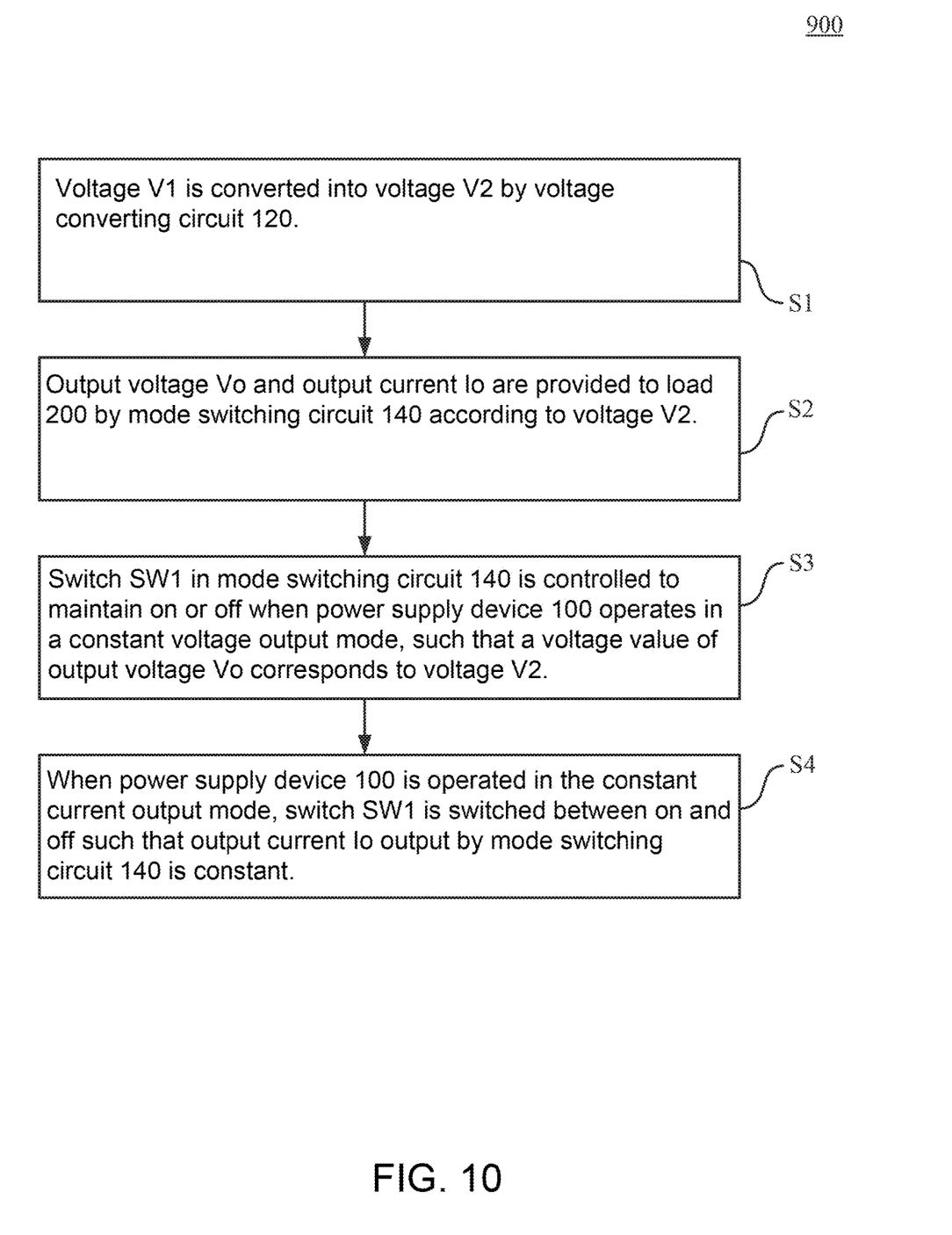
FIG. 10 is a flow diagram of a power supply device control method according to embodiments of the present disclosure.

Reference is made to FIG. 10. FIG. 10 is a flow diagram of a power supply device control method 900 according to embodiments of the present disclosure. For ease of understanding, the power supply device control 900 is described in line with the embodiments of FIGS. 1-9, the present disclosure, however, is not limited to such embodiments. As shown in FIG. 10, the power supply device control method 900 includes operations S1, S2, S3 and S4.

In operation S1, the voltage V1 is converted into the voltage V2 by the voltage converting circuit 120.

In operation S2, an output voltage Vo and an output current Io are provided to the load 200 by the mode switching circuit 140 according to the voltage V2.

In operation S3, a switch SW1 in the mode switching circuit 140 is controlled to maintain on or off when the power supply device 100 operates in a constant voltage output mode, such that a voltage value of the output voltage Vo corresponds to the voltage V2.

In operation S4, when the power supply device 100 is operated in the constant current output mode, the switch SW1 is switched between on and off such that the output current Io output by the mode switching circuit 140 is constant.

In embodiments, the power supply device control method 900 further includes detecting the output current Io and outputting the current feedback signal Ifb to the control circuit 160 by the current detecting circuit 180, and outputting the control signal CS to the switch SW1 according to the load state of the load 200 by the control circuit 160 to control the switch SW1 to be on or off. In the constant voltage output mode, the control signal CS is maintained at a constant level. In the constant current output mode, the control signal CS is switched between an enable level and a disable level through the control circuit 160 according to the current feedback signal Ifb, to adjust a duty cycle or a switching frequency of the control signal CS.

In embodiments, the power supply device control method 900 further comprises: outputting the control signal CS maintaining at the constant level by the control circuit 160 when the load state of the load 200 is less than a threshold value; and switching the control signal CS between the enable level and the disable level by the control circuit 160 when the load state of the load 200 is larger than the threshold value.

Those skilled in the art can directly understand how the power supply device control method 900 is based on the power supply device 100 in the above various embodiments to perform such operations and functions, and thus will not be described again.

In the above, exemplary steps are included. However, these steps are not necessarily performed in order. The steps mentioned in the detailed description can be adjusted according to actual needs, and can be performed simultaneously or partially simultaneously, unless the order is specifically described.

It should be noted that the various components in the above embodiments may be implemented by various types of digital or analog circuits, or may be implemented by different integrated circuit chips. Individual components can also be integrated into a single digital control chip. The above is only an example, and the present disclosure is not limited thereto, and those skilled in the art can select specific implementation manners of each component according to actual needs. For example, the transistor switches Q31-Q92 and the switch SW1/SW2 may be a Metal Oxide Semiconductor Field Effect Transistor (MOSFET), a Bipolar Junction Transistor (BJT), or other suitable semiconductor component. The control circuit 160 can be implemented as a Micro Controller Unit (MCU), a Central Processing Unit (CPU), or in other integrated circuit chips.

In sum, the power supply device 100 and the power supply device control method 900 in the various embodiments can selectively control the switch SW1/SW2 in the mode switching circuit 140 to be on or off, and improve the overall conversion efficiency of the power supply device 100, to achieve a more energy-efficient and environmentally friendly power supply.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A power supply device, comprising:
    a voltage converting circuit configured to receive a first voltage and convert the first voltage into a second voltage; and
    a mode switching circuit configured to provide an output voltage and an output current to a load according to the second voltage, wherein the mode switching circuit comprises a switch, the switch maintains on or off when the power supply device operates in a constant voltage output mode such that a voltage value of the output voltage corresponds to the second voltage and maintains constant during the constant voltage output mode, and switches between on and off when the power supply device operates in a constant current output mode such that the output current of the mode switching circuit is a constant value.

2. The power supply device of claim 1, further comprising:
    a control circuit configured to output a control signal to the switch to control the switch to be on or off according to a load state of the load, wherein the control signal maintains at a constant level in the constant voltage output mode.

3. The power supply device of claim 2, further comprising:
a current detecting circuit configured to detect the output current and output a current feedback signal to the control circuit;
wherein the control circuit switches the control signal between an enable level and a disable level according to the current feedback signal in the constant current output mode, to adjust a duty cycle or a switching frequency of the control signal.

4. The power supply device of claim 3, wherein the control signal has a first duty cycle and a first switching frequency when the output current has a first current value, the control signal has a second duty cycle and a second switching frequency when the output current has a second current value, wherein the first duty cycle is less than the second duty cycle or the first switching frequency is less than the second switching frequency when the first current value is larger than the second current value.

5. The power supply device of claim 3, wherein the control signal maintains at the constant level when the load state of the load is less than a threshold value, the control circuit switches the control signal between the enable level and the disable level when the load state of the load is larger than the threshold value.

6. The power supply device of claim 1, wherein the voltage converting circuit comprises:
a DC-AC converting unit configured to convert the first voltage into an AC voltage signal;
a transformer unit, a primary side of the transformer unit is electrically coupled to the DC-AC converting unit; and
an AC-DC converting unit electrically coupling to a secondary side of the transformer unit configured to convert the AC voltage signal coupled to the secondary side into the second voltage.

7. The power supply device of claim 1, wherein the mode switching circuit comprises a buck converter, the buck converter comprises the switch, a diode unit, an inductor unit and a capacitor unit, wherein a first end of the switch is electrically coupled to the voltage converting circuit, a cathode of the diode unit is electrically coupled to a first end of the inductor unit, a second end of the inductor unit is electrically coupled to a first end of the capacitor unit, a second end of the capacitor unit is electrically coupled to an anode of the diode unit, a second end of the switch is electrically coupled to the cathode of the diode unit or the anode of the diode unit.

8. The power supply device of claim 1, wherein the mode switching circuit comprises a boost converter, the boost converter comprises the switch, a diode unit, an inductor unit and a capacitor unit, wherein a first end of the inductor unit is electrically coupled to the voltage converting circuit, a second end of the inductor unit is electrically coupled to a first end of the switch and an anode of the diode unit, a cathode of the diode unit is electrically coupled to a first end of the capacitor unit, a second end of the capacitor unit is electrically coupled to a second end of the switch.

9. A power supply device control method, comprising:
converting a first voltage into a second voltage through a voltage converting circuit;
providing an output voltage and an output current to a load according to the second voltage through a mode switching circuit;
controlling a switch in the mode switching circuit to maintain on or off when the power supply device operates in a constant voltage output mode, such that a voltage value of the output voltage corresponds to the second voltage and maintains constant during the constant voltage output mode; and
controlling the switch to switch between on or off when the power supply device operates in a constant current output mode, such that an output current output by the mode switching circuit is a constant value.

10. The power supply device control method of claim 9, further comprising:
outputting a control signal to the switch through a control circuit to control the switch to be on or off according to a load state of the load, wherein the control signal maintains at a constant level in the constant voltage output mode.

11. The power supply device control method of claim 10, further comprising:
detecting the output current and outputting a current feedback signal to the control circuit through a current detecting circuit; and
switching the control signal between an enable level and a disable level through the control circuit according to the current feedback signal in the constant current output mode, to adjust a duty cycle or a switching frequency of the control signal.

12. The power supply device control method of claim 11, wherein the control signal has a first duty cycle and a first switching frequency when the output current has a first current value, the control signal has a second duty cycle and a second switching frequency when the output current has a second current value, wherein the first duty cycle is less than the second duty cycle or the first switching frequency is less than the second switching frequency when the first current value is larger than the second current value.

13. The power supply device control method of claim 11, further comprising:
maintaining the control signal at the constant level through the control circuit when the load state of the load is less than a threshold value; and
switching the control signal between the enable level and the disable level through the control circuit when the load state of the load is larger than the threshold value.

14. The power supply device control method of claim 9, further comprising:
converting the first voltage into an AC voltage signal through a DC-AC converting unit, the DC-AC converting unit is electrically coupled to a primary side of a transformer unit; and
converting the AC voltage signal coupling to a secondary side of the transformer unit into the second voltage through an AC-DC converting unit electrically coupling to the secondary side of the transformer unit.

15. The power supply device control method of claim 9, wherein the mode switching circuit comprises a buck converter, the buck converter comprises the switch, a diode unit, an inductor unit and a capacitor unit, wherein a first end of the switch is electrically coupled to the voltage converting circuit, a cathode of the diode unit is electrically coupled to a first end of the inductor unit, a second end of the inductor unit is electrically coupled to a first end of the capacitor unit, a second end of the capacitor unit is electrically coupled to an anode of the diode unit, a second end of the switch is electrically coupled to the cathode of the diode unit or the anode of the diode unit.

16. The power supply device control method of claim 9, wherein the mode switching circuit comprises a boost converter, the boost converter comprises the switch, a diode unit, an inductor unit and a capacitor unit, wherein a first end of the inductor unit is electrically coupled to the voltage converting circuit, a second end of the inductor unit is electrically coupled to a first end of the switch and an anode of the diode unit, a cathode of the diode unit is electrically coupled to a first end of the capacitor unit, a second end of the capacitor unit is electrically coupled to a second end of the switch.

* * * * *